United States Patent

Kawazoe et al.

[11] Patent Number: 5,883,179
[45] Date of Patent: *Mar. 16, 1999

[54] RUBBER COMPOSITION COMPRISING CARBON BLACK SURFACE TREATED WITH SILICA

[75] Inventors: Masayuki Kawazoe; Tetsuji Kawazura; Kouichi Ikai; Yoshiaki Hashimura; Fumito Yatsuyanagi; Kazunori Ishikawa, all of Hiratsuka, Japan

[73] Assignee: The Yokohama Rubber Co., Ltd., Tokyo, Japan

[*] Notice: The term of this patent shall not extend beyond the expiration date of Pat. No. 5,679,728.

[21] Appl. No.: 860,477

[22] PCT Filed: Oct. 16, 1996

[86] PCT No.: PCT/JP96/03003

§ 371 Date: Jun. 24, 1997

§ 102(e) Date: Jun. 24, 1997

[87] PCT Pub. No.: WO97/15620

PCT Pub. Date: May 1, 1997

[30] Foreign Application Priority Data

Oct. 25, 1995 [JP] Japan .................................. 7-277851
Oct. 25, 1995 [JP] Japan .................................. 7-277961

[51] Int. Cl.$^6$ ........................................................ C08K 3/00
[52] U.S. Cl. ........................... 524/492; 524/493; 524/495; 524/496
[58] Field of Search .................................... 524/492, 493, 524/495, 496

[56] References Cited

U.S. PATENT DOCUMENTS 5,679,728 10/1997 Kawazura et al. ...................... 523/215

FOREIGN PATENT DOCUMENTS 63-63755  3/1988  Japan .
6-210631  8/1994  Japan .

Primary Examiner—Edward J. Cain
Attorney, Agent, or Firm—Finnegan, Henderson, Farabow, Garrett & Dunner, L.L.P.

[57] ABSTRACT

A rubber composition containing at least one rubber component containing a diene rubber and a rubber reinforcing carbon black having silica deposited on the surface thereof.

9 Claims, No Drawings

RUBBER COMPOSITION COMPRISING CARBON BLACK SURFACE TREATED WITH SILICA

TECHNICAL FIELD

The present invention relates to a rubber composition for tire use containing carbon black having silica deposited on the surface thereof (hereinafter referred to as "silica surface-treated carbon black"). More specifically, it relates to a rubber master batch composition containing a diene rubber and a surface-treated carbon black for rubber reinforcement having amorphous silica deposited on the surface thereof. Such a rubber composition containing silica surface-treated carbon black may be used for various types of rubber products such as cap treads, side treads, and belt cord covering rubber of tires, and other tire materials and also belt conveyors, rubber rolls for industrial use, hoses, etc.

BACKGROUND ART

In the rubber industries, such as tire industry, carbon black for reinforcing the rubber is mixed with rubber in advance by a wet carbon black master batch method whereby the process of kneading the carbon black into the rubber has been attempted to be simplified and improvements in the dispersibility of the carbon black in the rubber have been attempted (for example, see Japanese Unexamined Patent Publication (Kokai) No. 59-49247 and Japanese Unexamined Patent Publication (Kokai) No. 63-43937).

Rubber compounds for tire use are usually used for applications where repeated deformation is applied. If the tan δ of the rubber compound in the high temperature region (for example, at 60° C.) is high, however, the amount of heat generated during use etc. becomes high, which is liable to lead to early breakage of the product such as tire. Therefore there has been a need for lowering the tan δ in the high temperature region, while maintaining the grip on wet roads, the wear resistance, the breakage strength, and other performances. For example, in tire compounds, improvement of the fuel consumption, durability, etc. requires that the tan δ be lowered in the high temperature region (40° C. to 100° C.), in particular at 60° C., but in general the braking performance (for example, wet grip), which is a contradictory property, falls as well. Thus, it becomes necessary to maintain this property.

In recent years, however, the appearance of superior silane coupling agents has led to the formulation of silica instead of carbon black. Silica has a lower tan δ at high temperatures (about 60° C.) compared with carbon black and a higher tan δ at low temperatures (about 0° C.), and therefore, when used for example for a rubber composition for a tire tread has the advantage of enabling production of a tire having a low rolling resistance and a high grip.

As this prior art, for example, Japanese Unexamined Patent Publication (Kokai) No. 3-239737 proposes blending a silica filler with an SBR obtained by the solution polymerization method or a blend thereof and a diene rubber. Further, Japanese Unexamined Patent Publication (Kokai) No. 3-252431 proposes the blending of a silica filler and silane coupling agent into an SBR obtained by the solution polymerization method or a blend thereof with a diene rubber. Further, Japanese Unexamined Patent Publication (Kokai) No. 3-253433 proposes the blending of a silica filler and silane coupling agent with solution polymerization BR or SBR having silane modified terminals.

While, according to the above-mentioned proposals the tan δ at the high temperature region can be reduced, without lowering the braking performance and other properties, however, the addition of the silica means that the wear resistance is inferior to that when just adding carbon black. Further, silica tends to make a high degree of self agglomeration, and therefore, is not easy to disperse. Thus the problem of inferior processability is caused. Further, silica is nonconductive, therefore, when silica is used alone for tire use, in particular tire tread use, without the use of a sufficient amount (normally about 40 parts by weight) of carbon black, results in insufficient flow of static electricity to the road surface and, as a result, charging and static discharge. The resultant discharge causes noise in the radio and other electronic apparatuses and in some cases causes erroneous operation of the same. Further, the vulcanization rate is slower, and therefore, a vulcanization promoter becomes necessary and the cost becomes higher.

Covering the surface of the pigment etc. with silica etc. to improve the dispersibility and improve the weather resistance has been proposed, for example, in Japanese Examined Patent Publication (Kokoku) No. 50-14254, Japanese Examined Patent Publication (Kokoku) No. 7-30269, etc. but none of these alludes to the deposition of silica on the surface of the carbon black for rubber reinforcement.

On the other hand, when blending silica with a rubber composition, it is difficult to cause the dispersion of the silica during the kneading and therefore a large amount of labor becomes necessary for the kneading. Thus, the preparation of master batches has been desired for silica like carbon black. Silica, however, has a different agglomeration pH (about 4 to 7) than the agglomeration pH region of carbon black (about 2.5 to 3), and therefore, in the past a satisfactory wet type silica master batch has not been able to be obtained.

DISCLOSURE OF INVENTION

Accordingly, an object of the present invention is to provide a rubber composition containing silica surface-treated carbon black which gives a rubber composition having the superior tan δ temperature dependency of silica and an excellent wear resistance and also free from the problems derived from a low electroconductivity.

Another object of the present invention is to provide a rubber composition for a tire which gives a rubber superior in wet grip and rolling resistance compared with use of carbon black alone, superior in wear resistance and with a smaller electrical resistance compared with use of silica alone, and therefore, free from the problem of noise in the radio and other electronic apparatuses, and which is superior in the dispersibility as well.

A further object of the present invention is to provide a rubber composition which has a superior effect in lowering the rolling resistance and improving the cut resistance of rubber for use for side treads and improving the cord adhesion and improving the hardness of rubber for use in covering belt cords.

In accordance with the present invention, there is provided a rubber composition comprising (a) at least one rubber component containing a diene rubber and (b) a rubber reinforcing carbon black having silica deposited on the surface thereof.

In accordance with the present invention, there is also provided a rubber composition comprising a rubber reinforcing surface-treated carbon black obtained by coagulating with a coagulating agent a mixture of (a) 100 parts by weight, in terms of solid content, of rubber latex containing a diene rubber and (b) 10 to 250 parts by weight in terms of solid content, of a slurry of carbon black for rubber reinforcement having amorphous silica deposited on the surface thereof.

In accordance with the present invention, there is further provided a rubber composition for tire use comprising at least one rubber component-containing a diene rubber to which is blended surface-treated carbon black composed of rubber reinforcing carbon black having a nitrogen specific surface area ($N_2SA$) of 25 to 250 $m^2/g$ and a DBP oil absorption of 70 to 180 ml/100 g on the surface of which is deposited with 0.1 to 20% by weight of silica.

BEST MODE FOR CARRYING OUT THE INVENTION

The present inventors, as explained above, succeeded in obtaining a rubber master batch composition containing silica by a wet method providing a rubber having the superior tan δ temperature dependency of silica, having an excellent wear resistance, and free from the problems derived from a low electroconductivity by causing a completely novel rubber reinforcement surface-treated carbon black to coagulate with a diene rubber latex.

According to the present invention, as explained above, carbon black having silica deposited (or precipitated) on the surface thereof (i.e., silica surface-treated carbon black) is blended at least one rubber ingredient containing a diene rubber. The amount of deposition of the silica in the silica surface-treated carbon black is 0.1 to 20% by weight, preferably, 0.3 to 15% by weight. If the content of the silica is too small, the balance between the tan δ in the high temperature region (40° C. to 100° C.) and the tan δ in the low temperature region (about 0° C.) is liable not to be improved, while conversely if the content of the silica is too large, the electroconductivity will be decreased, the agglomerating force of the filler will become stronger, and dispersibility during the kneading may become insufficient.

As the rubber reinforcement carbon black usable as the starting substance for manufacture of silica surface-treated carbon black for the rubber reinforcement used in the present invention, any carbon black generally used as carbon for reinforcement of rubber for tires etc. in the past can be used. A preferable carbon black is a GPF to SAF grade of rubber reinforcement carbon black produced by the oil furnace method. The type may be determined depending upon the application or utility of the rubber composition and blends of two or more types may be used as well.

The silica surface-treated carbon black according to the present invention may be produced, for example, as follows. That is, the rubber reinforcing carbon black is first dispersed in water. To improve the dispersibility of the carbon black, a suitable dispersant, for example, methanol or various types of surfactants, is added to make a homogeneous slurry. Next, an amount of sodium silicate corresponding to the amount of silica to be deposited on the surface of the carbon black is added, under stirring, in the form of an aqueous solution, for example, to the aqueous slurry of carbon black thus obtained. Note that the amount of silica to be deposited on the surface of the carbon black is not particularly limited, but is preferably 0.1 to 25% by weight based on the weight of the silica surface-treated carbon black. If the amount of deposition of silica is too great, there is a tendency for difficulty in coagulation with the rubber latex. On the other hand, at the same time as the aqueous solution of the sodium silicate, to neutralize the sodium silicate added, an acid, for example, sulfuric acid, hydrochloric acid, nitric acid, etc., is added with stirring. It is preferable to perform the addition of the aqueous solution of the acid and the addition of the sodium silicate simultaneously and in substantially the same amounts. The preferable feed rate of the sodium silicate is 0.001 to 0.110 g/min, in terms of the amount of silica, based upon 100 parts by weight of carbon black.

The pH of the reaction system at the stage of the above surface-treatment reaction is preferably 6 to 12, and the reaction temperature is preferably from 50° to 95° C. from a practical viewpoint. In the stage of the above surface treatment reaction, after the amorphous silica is deposited on the surface of the carbon black, it is possible to adjust the pH of the system to not more than 7, allow the mixture to stand at a temperature of 50° to 95° C., with stirring, to cause aging and thereby obtain a slurry of the desired silica surface-treated carbon black.

However, the silica surface-treated carbon black according to the present invention is not limited to this process of production. It may also be produced by placing carbon black produced by the oil furnace method etc. into an atmosphere for producing white carbon so as to cause silica to deposit on the surface of the carbon black.

The total amount of the silica in the rubber reinforcer produced by this method is not necessarily physically or chemically bonded to the surface of the carbon black, but observation by a transmission type electron microscope (about 600,000×) confirms that there is silica deposited on the carbon black. Further, observation of the silica surface-treated carbon black obtained by kneading once with rubber, then pyrolyzing the rubber ingredient in nitrogen also shows silica deposited on the carbon black, and therefore, it is considered that the deposited silica and carbon have bonds of a certain degree of strength.

The silica surface-treated carbon black according to the present invention has a nitrogen specific surface area ($N_2SA$), measured according to ASTM D 3037, of 20 to 250 $m^2/g$, preferably 55 to 250 $m^2/g$ in the case of the rubber composition for a cap or under tread, 25 to 120 $m^2/g$ in the case of the rubber composition for a side tread and 70 to 150 $m^2/g$, in the case of the rubber composition for a tire belt cord covering. With a nitrogen specific area of less than 20 $m^2/g$, the reinforcement of the rubber is insufficient and the breaking strength and wear resistance may decrease, while conversely if the nitrogen specific area is more than 250 $m^2/g$, kneading into the rubber becomes difficult and the dispersibility is liable to become poor.

The silica surface-treated carbon black according to the present invention has a DBP oil absorption, measured according to JIS K 6221, of 70 to 180 ml/100 g, preferably 70 to 180 ml/100 g in the case of the rubber composition for a cap or under tread, 70 to 150 ml/100 g in the case of the rubber composition for a side tread, and 70 to 150 ml/100 g in the case of the rubber composition for a tire belt cord covering.

The rubber ingredient which is blended into the rubber composition according to the present invention may be a rubber ingredient containing a diene rubber-alone or a mixture or two or more types. The blending of the silica surface-treated carbon black improves its wear resistance, grip performance, rolling resistance, etc.

As the diene rubber, any rubber which has been used for tires in the past can be used. For example, natural rubber (NR), various types of butadiene rubbers (BR), various types of styrene-butadiene copolymer rubbers (SBR), polyisoprene rubber (IR), butyl rubber (IIR), acrylonitrile butadiene rubber, chloroprene rubber, styrene-isoprene copolymer rubber, styrene-isoprene-butadiene copolymer rubber, isoprene-butadiene copolymer rubber, etc. may be mentioned. As other rubbers, ethylene-propylene copolymer rubber, ethylene-propylene-diene copolymer rubber, cblorosulfonated polyethylene, acryl rubber, epichlorohydrin, polysulfide rubber, silicone rubber, fluororubber, urethane rubber, etc. may be used. When mixtures of two or more types are used, the ratio of the blend is not particularly limited.

According to the present invention, the silica surface-treated carbon black is preferably added in 10 to 250 parts by weight, more preferably 15 to 200 parts by weight, particularly preferably 10 to 100 parts by weight, to 100 parts by weight of the rubber ingredient. If the amount of formulation is too small, the desired effect cannot be obtained, while conversely if the amount is too large, the hardness becomes too high, the processability declines, and the practical value as a rubber material may otherwise become unpreferably poor.

The rubber composition of the present invention may contain, in addition to the above-mentioned silica surface-treated carbon black, any carbon black and/or silica usually blended into a rubber composition.

The amount of the ordinary carbon black and/or silica blended at this time must be no more than 10 times the silica surface-treated carbon black in weight, preferably no more than 8 times. If the amount of the carbon black blended is too large, the desired effect cannot be obtained.

In preferable embodiments of the rubber composition of the present invention, there are provided rubber compositions for tire cap tread, under tread, side tread, and tire belt cord covering.

In the tire tread and under tread rubber compositions, the preferable rubber for inclusion as the rubber ingredient may be rubbers selected from natural rubber (NR), polyisoprene rubber (IR), styrenebutadiene copolymer rubber (SBR), polybutadiene rubber (BR), butyl rubber (IIR), acrylonitrile butadiene rubber (NBR), etc.

As opposed to this, the rubber composition, for the tire side tread the preferable rubber for inclusion as the rubber ingredient may be one or more types of diene rubbers selected from NR, IR, BR, SBR, BR including 1,2-syndiotactic polybutadiene, NR or BR including microfilaments (e.g., nylon etc.) This is because the rubber for side tread requires particularly superior flex fatigue resistance and damage resistance.

In the rubber composition for tire belt cord covering, the rubber included as the rubber ingredient is preferably NR, IR, SBR, or BR. This is because toughness and bondability with steel cord or organic cord are required.

The rubber compositions according to the present invention for tire cap tread, under tread, side tread, and tire belt cord covering, as explained above, include as fillers 10 to 200 parts by weight or 10 to 100 parts by weight of a silica surface-treated carbon black based upon 100 parts by weight of a rubber ingredient containing a diene rubber. If the amount of the filler blended is too small, the tensile strength etc. of the rubber composition are decreased, while conversely if the amount is too large, the hardness and the heat generated along with deformation will increase too much and exceed the practical range. In addition, the viscosity of the rubber composition when still unvulcanized will become too high. None of these is desirable.

In the present invention, the silica surface-treated carbon black preferably has a nitrogen specific surface area of 55 to 250 $m^2/g$ and a DBP oil absorption of 70 to 180 ml/100 g in the case of tire cap tread and under tread. If the value of the nitrogen specific surface area of the silica surface-treated carbon black is too low, the wear resistance, tensile strength, etc. are decreased, which are not desirable, while if the value is too high, the dispersibility at the time of kneading of the rubber becomes difficult, which is also not desirable.

On the other hand, in the case of a rubber composition for a side tread, the silica surface-treated carbon black preferably has a nitrogen specific surface area of 25 to 120 $m^2/g$ and a DBP oil absorption of 70 to 150 ml/100 g. If this value is too low, the tensile strength, modulus, etc. again become low, while if the value is too high, in the nitrogen specific surface area, the heat generation becomes large, which is again not desirable, and, in the DIBP oil absorption, when a DBP oil absorption is less than 70 ml/100 g, the cut resistance is decreased, while when the DBP oil absorption is more than 150 ml/100 g, the crack resistance is decreased.

In the case of the rubber composition for a tire belt cord covering, the silica surface-treated carbon black preferably has a nitrogen specific surface area of 70 to 150 $m^2/g$ and a DBP oil absorption of 70 to 150 ml/100 g. If this value is too low, the modulus becomes low, while conversely if the value is too high, the viscosity of the unvulcanized rubber at the time of rolling becomes high and the processing becomes difficult.

The properties of the carbon black other than that surface treated with silica, which is sometimes mixed into the rubber composition for tire tread, under tread, side tread and belt cord covering according to the preferable embodiments of the present invention are not particularly limited, but preferably the carbon is one which is usually used for rubber, that is, as a particle size grade, the FEF to SAF grades.

According to the preferable embodiment of the present invention, a silane coupling agent is further blended into the above-mentioned rubber composition. The amount of the silane coupling agent blended is not particularly limited, but one of the features of silica surface-treated carbon black is that it displays an effect in smaller amounts than in the case of use of a usual silica. For example, it is possible to blend this in 0.1 to 8% based upon the weight of the silica surface-treated carbon black blended. Of course, it is also possible to blend in a greater amount.

If the amount of the silane coupling agent blended is too large, not only is there no particular improvement in the physical properties, but also it is not preferable that the costs is increased and the scorch time is shortened, etc.

As the silane coupling agent which may be used in the preferable embodiment of the present invention, any silane coupling agent which has been blended into conventional rubber compositions together with a silica filler may be blended. As such a silane coupling agent, for example, vinyltrichlorosilane, vinyltrimethoxy-silane, vinyltriethoxysilane, vinyltris(β-methoxyethoxy) silane, β-(3,4-ethoxycyclohexyl)ethylktrimethoxysilane, γ-glycydoxypropyltrimethoxysilane, γ-glycydoxypropyl-methyldiethoxysilane, γ-glycydoxypropyltriethoxysilane, γ-methacryloxypropylmethyldimethoxysilane, γmethacryloxypropyltrimethoxysilane, γ-methacryloxy-propylmethyldiethoxysilane, γ-methacryloxypropyl-triethoxysilane, N-β(aminoethyl) γ-aminopropyl-methyldimethoxysilane, N-β(aminoethyl) γ-aminopropyl-trimethoxysilane, N-β(aminoethyl) γ-aminopropyl-triethoxysilane, γ-aminopropyltrimethoxysilane, γ-aminopropyltriethoxysilane, N-phenyl-γ-amino-propyltrimethoxysilane, γ-chloropropyltrimethoxysilane, γ-mercaptopropyltrimethoxysilane, bis-(3-[triethoxysilyl]-propyl)-tetrasulfan, etc. may be mentioned.

The rubber composition of the present invention may suitably contain, in addition to the above-mentioned rubber, carbon black having silica deposited on the surface thereof, and optional silane coupling agent, any compounding agent which is normally used in the rubber industry, for example, sulfur, an organic peroxide, a softening agent, an antioxidant, a vulcanization accelerator, a filler, a plasticizer, etc., if necessary, in the normally used range. Further, for the process of production of the rubber composition of the present invention, the kneading method, vulcanization method, and the like normally used in the rubber industry may be used.

Further, the rubber composition containing silica surface-treated carbon black according to the present invention may be produced by the same method as the normal wet type carbon black master batch method. In the above method, a slurry of carbon black having silica deposited on the surface thereof is produced then this is mixed with a diene rubber latex (e.g., SBR latex), in a suitable ratio. Next, in accordance with the conventional method of production of a carbon black master batch, sulfuric acid or another acid is added to cause coagulation. Further, a conventional coagulation agent (for example, high molecular weight coagulant, NaCl, etc.) may be used. Next, the coagulated rubber composition is separated from the aqueous phase and is cleared of moisture by, for example, drying with hot air so as to obtain the desired rubber master batch composition. Note that in the above process, it is possible to added an antioxidant, process oil, silane coupling agent, or other additive if necessary.

The silica surface-treated carbon black used in the present invention, as explained above, is produced by causing amorphous silica to deposit on the surface of carbon black by a reaction of sodium silicate, sulfuric acid, etc. in, for example, a carbon black slurry, and therefore the surface-treated carbon black exists in a slurry state. Therefore, the rubber composition of the present invention can be produced even if this slurry is directly mixed with the rubber latex This enables the elimination of the labor in the kneading of the silica into the rubber and also results in an excellent dispersibility of the silica in the rubber. Further, the step of recovering the surface-treated carbon black from the slurry and drying it is eliminated—which contributes further to the reduction of the manufacturing costs.

In a preferable embodiment of the present invention, when performing the above wet type mixing, it is possible to blend 10 to 200 parts by weight of other ingredients generally used in formulations of rubber in the past, such as aroma oil, paraffinic oil, naphthenic oil, and other process oils and/or synthetic plasticizers, liquid rubber, and other liquids, based upon 100 parts by weight of the diene family rubber.

EXAMPLES

The present invention will now be further illustrated by, but is by no means limited to, the following Examples.

Example I-1 to I-5 and Comparative Examples I-1 to I-3

Preparation of Silica Surface Treated Carbon Black

As the carbon black, the rubber reinforcement carbon black shown in Table I-1 was used. 200 g of a 10 wt % aqueous solution of a carbon black dispersant (i.e., methanol) was well mixed into 100 g of carbon black (CB), then 1.8 liters of water was added while stirring to obtain a homogeneous carbon black slurry. Next, since the desired amount of the silica to be deposited on the surface of the carbon black was, here, 10 wt %, the corresponding amount of sodium silicate, that is, 33.3 g, was weighed and diluted with 0.2 liter of water.

The carbon black slurry obtained above was heated to 90° C. and adjusted to pH 9. To this slurry was dropwise added the aqueous solution of sodium silicate obtained above at a rate of 0.060 g/min with sufficient stirring At the same time, the pH of the system was adjusted to 9 by adding a 2.0 wt % aqueous solution of sulfuric acid.

When the addition of the aqueous solution of sodium silicate was completed, the mixture was allowed to stand, while maintaining a pH 10 and a temperature of 90° C., while stirring for about 30 minutes (aging) to obtain the desired slurry-like substance (solid content of 4.0 wt %) including the surface-treated carbon black.

Measurement of Silica Content of Surface Treated Carbon Black

A sample of the surface-treated carbon black was pyrolyzed in an electric furnace at 600° C., then the ash was treated with hydrofluoric acid and the reduction in weight expressed as the silica content as a percentage of the weight of the original surface-treated carbon. The results are shown in Table I-1.

TABLE I-1

|  | Ex. I-1 | Comp. Ex. I-1 | Comp. Ex. I-2 | Comp. Ex. I-3 |
| --- | --- | --- | --- | --- |
| Type of filler | Surface-treated carbon black*1 | Carbon black*2 | Silica | Carbon black/silica |
| Amount of filler (phr) | 50e | 50 | 50 | 25/25 |
| Type of polymer | SBR1502 | SBR1502 | SBR1502 | SBR1502 |
| Coagulation state | Good*3 | Good*3 | Silica/rubber separate*4 | Silica/rubber separate*4 |
| Amount of silica (wt %) | 3.27 | 0.0 | — | — |

*1Surface-treated carbon black: Carbon black of N339 (Seast KH: made by Tokai Carbon Co.) on whose surface amorphous silica is deposited to 10 wt %
*2Carbon black N339 (Seast KH: made by Tokai Carbon Co.)
*3Filler and rubber integral. Filler homogeneously dispersed in rubber.
*4Filler and rubber are separately present. A part of filler in the rubber does not homogeneously disperse in the rubber.

TABLE I-1-continued

|  | Ex. I-2 | Ex. I-3 | Ex. I-4 | Ex. I-5 |
|---|---|---|---|---|
| Type of filler | Surface-treated carbon black[*1] | Surface-treated carbon black[*2] | Surface-treated carbon black[*3] | Surface-treated carbon black[*4] |
| Amount of filler (phr) | 50 | 50 | 50 | 50 |
| Type of polymer | SBR1502 | SBR1502 | 5BR1502 | SBR1502 |
| Coagulation state | Good[*5] | Good[*5] | Good[*5] | Good[*5] |
| Amount of silica (wt %) | 3.27 | 3.32 | 3.22 | 3.35 |

[*1]Surface-treated carbon black: carbon black of GPF (Seast V: made by Tokai Carbon Co.) on surface of which amorphous silica is deposited to 10 wt %.
[*2]Surface-treated carbon black: carbon black of FEF (Seast SO: made by Tokai Carbon Co.) on surface of which amorphous silica is deposited to 10 wt %.
[*3]Surface-treated carbon black: carbon black of ISAF (Seast 6: made by Tokai Carbon Co.) on surface of which amorphous silica is deposited to 10 wt %.
[*4]Surface-treated carbon black: carbon black of SAF (Seast 9: made by Tokai Carbon Co.) on surface of which amorphous silica is deposited to 10 wt %.
[*5]Filler and rubber are integrated. Filler homogeneously dispersed in rubber.

Preparation of Rubber Composition Containing Surface-Treated Carbon Black

Next, the surface-treated carbon black obtained above was made into a slurry (concentration of 12.5 wt %). 200 g of this slurry and 125 g of SBR1502 latex (concentration of 41 wt %) were mixed. 1000 g of saline water (concentration of 3 wt %) was added to this as a coagulant, then the mixture was stirred at a temperature of 50° C. for 0.5 hour to obtain the rubber reinforcing rubber composition containing silica surface-treated carbon black.

Methods of Measurement of Physical Properties of Rubber

The physical properties of rubber were evaluated for a rubber composition of the present invention, that is, Example I-1 of Table I-1, in comparison with a case of kneading by the usual dry blend method and a case of use of carbon black.

Various types of rubber compositions were prepared by ordinary methods by kneading the following formulations by a Bambury mixer and roll machine (vulcanization conditions: 160° C.×30 minutes). The results are shown in Table I-2.

Formulation Table

| | |
|---|---|
| Diene rubber (SBR1502) | 100 parts by weight |
| Reinforcing filler (see Table I-1) | 50 parts by weight |
| Silane coupling agent[*1] | 3 parts by weight[*2] |
| Zinc oxide (JIS NO. 3) | 3 parts by weight |
| Stearic acid | 2 parts by weight |
| Antioxidant[*3] | 2 parts by weight |
| Powdered sulfur | 2 parts by weight |
| Vulcanization accelerator[*4] | 1 part by weight |

[*1])Si 69 (made by Degussa Co.)
[*2])Not used when reinforcing filler is carbon black
[*3])Santoflex 13 (Made by Monsanto Corp.)
[*4])Santocure NS (Made by Monsanto Corp.)

TABLE I-2

|  | Ex. I-6 | | Comp. Ex. I-4 | | Comp. Ex. I-5 | |
|---|---|---|---|---|---|---|
| Master batch used | Ex. I-1 composition | | None, dry blend | | None, dry blend | |
| Type of reinforcing filler | Surface-treated carbon black[*1] | | Carbon black[*2] | | Silica[*3] | |
| Kneading time[*4] | 1 min. | 4 min. | 2 min. | 4 min. | 2 min. | 4 min. |
| Kneading state[*4] | No problem | No problem | Carbon intake poor | No problem | Carbon intake poor | No problem |
| tan δ 60° C.[*5] | 0.158 | 0.160 | — | 0.186 | — | 0.159 |
| tan δ 0° C.[*5] | 0.310 | 0.307 | — | 0.305 | — | 0.310 |
| Wear resistance index[*6] | 99 | 101 | — | 100 | — | 76 |

[*1]Surface-treated carbon black: carbon black of N339 (Seast KH: made by Tokai Carbon Co.) on whose surface amorphous silica is deposited to 10 wt %.
[*2]N339 Seast KH (made by Tokai Carbon)
[*3]Nipsil AQ (made by Nippon Silica Kogyo Co.)
[*4]Performed by 1.5 liter Banbury mixer. Rubber and compounding agents (excluding vulcanization system) simultaneously added. State after being discharged a predetermined time later is observed.
[*5]Viscoelasticity spectrometer made by Toyo Seiki Seisakusho used and tan δ measured under conditions of temperature of 0° C. or 60° C., static stress of 10%, dynamic stress of ± 2%, and frequency of 20 Hz.
[*6]Lambourn wear tester used for measurement under conditions of room temperature, slip ratio of 35%, and load of 6 kg. Results expressed as index using one carbon black formulation as 100. The larger the figure, the better the wear resistance shown.

Example II-1 to II-14 and Comparative Example II-1 to II-19

Preparation of Silica Surface-Treated Carbon Black

The silica surface-treated carbon black was prepared by the following method. That is, carbon black slurry was prepared according to an ordinary method and warmed to 90° C., then diluted JIS No. 1 sodium silicate was added by a constant feed pump, while maintaining a pH of 5 to 10 with dilute sulfuric acid and an aqueous solution of sodium hydroxide so as to cause silica to deposit on the carbon surface. Next, the pH was made 6 and the mixture was allowed to stand for 1 hour, then was filtered, washed with water, and dried to obtain the desired substance. The change of the silica content was performed by adjusting the amount of addition of the sodium silicate and the pH of the system.

The silica content in the silica surface-treated carbon black (CB) was found by pyrolyzing the silica surface-treated carbon black in an electric furnace at 600° C., then performing fluorination and the following processing and then finding the content by the following formula:

Silica content (%)=[Loss of weight due to fluorination/Weight of surface-treated carbon black]×100

Fluorination: About 200 mg of the sample was weighed with and placed in a polyethylene beaker. This was moistened with distilled water, then 5 mg of hydrofluoric acid was added. This was stirred and allowed to stand for 5 minutes, then was suction filtered, washed well with water, and dried.

The properties of the prepared silica surface-treated carbon black are shown in Table II-1. The methods of measurement are as explained below.

Nitrogen specific surface area: ASTM D3037
DBP oil absorption: JIS K6221 "Test Methods for Carbon Black for Rubber"

TABLE II-1

(Properties of Surface-Treated Carbon Black)

| | Original carbon black properties | | | |
| --- | --- | --- | --- | --- |
| | Carbon black grade | Nitrogen specific surface area $m^2/g$ | DBP oil absorption ml/100 g | Silica wt % |
| Surface-treated carbon black 1 | HAF (N339) | 94 | 132 | 0.6 |
| Surface-treated carbon black 2 | " | " | " | 5.5 |
| Surface-treated carbon black 3 | " | " | " | 10.8 |
| Surface-treated carbon black 4 | " | " | " | 18.3 |
| Surface-treated carbon black 5 | " | " | " | 25.0 |
| Surface-treated carbon black 6 | ISAF (N220) | 111 | 115 | 10.1 |
| Surface-treated carbon black 7 | ISAF-HS | 125 | 170 | 10.7 |
| Surface-treated carbon black 8 | SAF (N110) | 144 | 118 | 10.2 |

The basic formulations (parts by weight) of the various rubber compositions used in the following Examples and Comparative Examples are shown in Table II-2 (Formulation 1), Table II-3 (Formulation 2), and Table II-4 (Formulation 3).

TABLE II-2

| | |
| --- | --- |
| SBR1502*[1] | 100 |
| Reinforcing filler | Carbon black, silica surface-treated carbon suitably used |
| Silane coupling agent*[2] | q.s. |
| Vulcanization promoter*[3] | q.s. |
| Zinc white | 3 |
| Stearic acid | 2 |
| Antioxidant*[4] | 2 |
| Wax | 1 |
| Sulfur | 1.8 |
| Vulcanization accelerator*[5] | 0.8 |

*[1])NIPOL 1502: made by Nippon Zeon Co.
*[2])Si 69: made by Degussa Co.
*[3])Diethylene glycol
*[4])Santoflex 13: made by Monsanto Corp.
*[5])Santocure NS: made by Monsanto Corp.

TABLE II-3

| | |
| --- | --- |
| Solution polymerization SBR*[1] | 35 |
| Natural rubber | 65 |
| Reinforcing filler | Carbon black, silica, surface-treated carbon suitably used |
| Silane coupling agent*[2] | q.s. |
| Vulcanization promoter*[3] | q.s. |
| Zinc white | 3 |
| Stearic acid | 2 |
| Antioxidant*[4] | 2 |
| Wax | 1 |
| Sulfur | 2 |
| Vulcanization accelerator*[5] | 1 |

*[1])NIPOL NS 116: made by Nippon Zeon Co.
*[2])Si 69: made by Degussa Co.
*[3])Diethylene glycol
*[4])Santoflex 13: made by Monsanto Corp.
*[5])Santocure NS: made by Monsanto Corp.

TABLE II-4

| | |
| --- | --- |
| Solution polymerization SBR*[1] | 65 |
| BR*[2] | 35 |
| Reinforcing filler | Carbon black, silica, surface-treated carbon suitably used |
| Silane coupling agent*[3] | q.s. |
| Vulcanization promoter*[4] | q.s. |
| Zinc white | 3 |
| Stearic acid | 2 |
| Antioxidant*[5] | 3 |
| Wax | 1.5 |
| Aroma oil | 30 |
| Sulfur | 1.7 |
| Vulcanization accelerator*[6] | 0.8 |

*[1])NS 116: made by Nippon Zeon Co.
*[2])NIPOL BR 1220: made by Nippon Zeon Co.
*[3])Si 69: made by Degussa Co.
*[4])Diethylene glycol
*[5])Santoflex 13: made by Monsanto Corp.
*[6])Santocure NS: Made by Monsanto Corp.

Various rubber compositions were prepared by the formulations of Table II-5 (Examples II-1 to II-8 and Comparative Examples II-1 to II-9), Table II-6 (Examples II-9 to II-10 and Comparative Examples II-10 to 13), Table II-7 (Example II-11 to II-12 and Comparative Examples II-14 to II-17), and Table II-8 (Examples II-13 to II-14 and Comparative Examples II-18 to II-19) (using the above Formulation 1) (parts by weight) by an ordinary method by mixing and kneading by a Bambury mixer and kneading roller. These rubber compositions were vulcanized by pressing at 160° C. for 20 minutes to prepare the target test pieces which were then subjected to various types of tests to measure their physical properties. The results are shown in Table II-5 to Table II-8. Note that the test methods were as follows:

TABLE II-5

|  | Comp. Ex. II-1 | Comp. Ex. II-2 | Ex. II-1 | Comp. Ex. II-3 | Comp. Ex. II-4 | Comp. Ex. II-5 | Comp. Ex. II-6 | Ex. II-2 | Ex. II-3 |
|---|---|---|---|---|---|---|---|---|---|
| Carbon black N 339*[1] | 40 | — | — | 50 | — | — | — | — | — |
| Silica*[2] | — | 40 | — | — | 50 | 50 | 50 | — | — |
| Surface-treated carbon 1*[3] | — | — | 40 | — | — | — | — | 50 | — |
| Surface-treated carbon 2*[3] | — | — | — | — | — | — | — | — | 50 |
| Surface-treated carbon 3*[3] | — | — | — | — | — | — | — | — | — |
| Surface-treated carbon 4*[3] | — | — | — | — | — | — | — | — | — |
| Surface-treated carbon 5*[3] | — | — | — | — | — | — | — | — | — |
| Silane coupling agent | — | 4 | 2 | — | 5 | 2.5 | 5 | 2.5 | 2.5 |
| Vulcanization promotor | — | 2 | — | — | 2.5 | 2.5 | — | — | — |
| Water resistance index | 100 | 65 | 95 | 114 | 88 | 85 | 86 | 104 | 108 |
| Wet braking performance | 100 | 103 | 99 | 118 | 119 | 112 | 113 | 115 | 115 |
| Rolling resistance index | 100 | 93 | 87 | 121 | 106 | 109 | 108 | 105 | 109 |
| Electrical resistance ($\Omega$ cm) | 1.1E+3 | 1.8E+14 | 3.2E+14 | 1.2E+2 | 1.5E+14 | 1.5E+14 | 2.0E+14 | 1.7E+2 | 3.6E+2 |
| Vulcanization acceleration index | 100 | 119 | 101 | 96 | 130 | 128 | 137 | 112 | 112 |

|  | Ex. II-4 | Ex. II-5 | Comp. Ex. II-7 | Ex. II-6 | Comp. Ex. II-8 | Comp. Ex. II-9 | Ex. II-7 | Ex. II-8 |
|---|---|---|---|---|---|---|---|---|
| Carbon black N 339*[1] | — | — | — | 20 | 60 | — | — | — |
| Silica*[2] | — | — | — | — | — | 60 | — | — |
| Surface-treated carbon 1*[3] | — | — | — | 30 | — | — | 60 | 60 |
| Surface-treated carbon 2*[3] | — | — | — | — | — | — | — | — |
| Surface-treated carbon 3*[3] | 50 | — | — | — | — | — | — | — |
| Surface-treated carbon 4*[3] | — | 50 | — | — | — | — | — | — |
| Surface-treated | — | — | 50 | — | — | — | — | — |
| Silane coupling agent | 2.5 | 2.5 | 2.5 | 1.5 | — | 6 | 3 | 3 |
| Vulcanization promoter | — | — | — | — | — | 3 | — | 2 |
| Wear resistance index | 109 | 104 | 103 | 107 | 128 | 110 | 114 | 114 |
| Wet braking performance | 116 | 117 | 117 | 117 | 135 | 136 | 132 | 133 |
| Rolling resistance index | 113 | 109 | 108 | 114 | 143 | 118 | 121 | 120 |
| Electrical resistance ($\Omega$ cm) | 6.0E+2 | 9.7E+3 | 1.1E+4 | 1.3E+2 | 4.5E+1 | 2.4E+14 | 7.6E+0 | 7.6E+0 |
| Vulcanization acceleration index | 116 | 118 | 123 | 105 | 92 | 142 | 104 | 94 |

*[1]Carbon black N 339: Seast KH (made by Tokai Carbon Co.)
*[2]Silica: Nipsil AQ (made by Nippon Silica Kogyo Co.)
*[3]Surface-treated carbon 1: see Table II-1

TABLE II-6

|  | Comp. Ex. II-10 | Comp. Ex. II-11 | Ex. II-9 | Comp. Ex. II-12 | Comp. Ex. II-13 | Ex. II-10 |
|---|---|---|---|---|---|---|
| Carbon black N 220*[1] | 40 | — | — | 60 | — | — |
| Silica*[2] | — | 40 | — | — | 60 | — |
| Surface-treated carbon 6*[3] | — | — | 40 | — | — | 60 |
| Silane coupling agent | — | 4 | 2 | — | 6 | 3 |
| Vulcanization promoter | — | 2 | — | — | 3 | — |
| Wear resistance index | 100 | 62 | 101 | 128 | 105 | 138 |
| Wet braking performance | 100 | 90 | 98 | 128 | 119 | 123 |
| Rolling resistance index | 100 | 83 | 88 | 140 | 105 | 112 |

TABLE II-6-continued

|  | Comp. Ex. II-10 | Comp. Ex. II-11 | Ex. II-9 | Comp. Ex. II-12 | Comp. Ex. II-13 | Ex. II-10 |
|---|---|---|---|---|---|---|
| Electrical resistance ($\Omega$ cm) | 7.1E + 0 | 1.8E + 14 | 1.5E + 1 | 6.7E − 1 | 2.4E + 14 | 1.1E + 0 |
| Vulcanization acceleration index | 100 | 107 | 103 | 90 | 114 | 1oo |

*[1]Carbon black N 220: Seast: 6 (made by Tokai Carbon Co.)
*[2]Silica : Nipsil AQ (made by Nippon Silica Kogyo Co.)
*[3]Surface-treated carbon 6: see Table II-1.

TABLE II-7

|  | Comp. Ex. II-14 | Comp. Ex. II-15 | Ex. II-11 | Comp. Ex. II-16 | Comp. Ex. II-17 | Ex. II-12 |
|---|---|---|---|---|---|---|
| Carbon black ISAF-HS*[1] | 40 | — | — | 60 | — | — |
| Silica*[2] | — | 40 | — | — | 60 | — |
| Surface-treated carbon 7*[3] | — | — | 40 | — | — | 60 |
| Silane coupling agent | — | 4 | 2 | — | 6 | 3 |
| Vulcanization promoter | — | 2 | — | — | 3 | — |
| Wear resistance index | 100 | 53 | 109 | 107 | 90 | 117 |
| Wet braking performance | 100 | 94 | 99 | 121 | 124 | 123 |
| Rolling resistance index | 100 | 87 | 95 | 137 | 110 | 119 |
| Electrical resistance ($\Omega$ cm) | 2.2E + 1 | 1.8E + 14 | 4.8E + 1 | 5.0E + 0 | 1.5E + 14 | 8.0E + 0 |
| Vulcanization acceleration index | 100 | 122 | 116 | 95 | 130 | 119 |

*[1]Carbon black ISAF-HS: CD2005 (made by Colombian Chemicals Co.)
*[2]Silica: Nipsil AQ (made by Nippon Silica Industry Co.)
*[3]Surface-treated carbon 7: see Table II-1

TABLE II-8

|  | Comp Ex. II-18 | Ex. II-13 | Comp. Ex. II-19 | Ex. II-14 |
|---|---|---|---|---|
| Carbon black N 110*[1] | 60 | — | 80 | — |
| Surface-treated carbon 8*[2] | — | 60 | — | 80 |
| Silane coupling agent | — | 3 | — | 4 |
| Aroma oil | 20 | 20 | 30 | 30 |
| Wear resistance index | 100 | 107 | 112 | 117 |
| Wet braking performance | 100 | 100 | 122 | 121 |
| Rolling resistance index | 100 | 93 | 129 | 116 |
| Electrical resistance ($\Omega$cm) | 5.0 E + 0 | 5.7 E + 0 | 8.7 E + 1 | 9.4 E − 1 |
| Vulcanization acceleration index | 100 | 108 | 98 | 110 |

*[1])Carbon black N 110: Seast 9 (made by Tokai Carbon Co.)
*[2])Surface-treated carbon 8: see Table II-1

Methods of Measurement of Various Types of Physical Properties

Vulcanization Acceleration Index

A sample of unvulcanized rubber was tested by a rheometer at 160° C. to find the T95. The result was shown as an index using one of the carbon black formulations as 100. The smaller the figure, the less a delay in vulcanization shown.

Wear Resistance

A Lambourn wear tester was used to measure the wear resistance under conditions of a room temperature, a slip ratio of 35%, and a load of 5 kg. The result was shown as an index using one of the carbon black formulations as 100. The larger the figure, the better the wear resistance.

Wet Braking Performance

A viscoelasticity spectrometer made by Toyo Seiki Seisakusho Co. was used and the tan δ measured under conditions of a temperature of 0° C., a static stress of 10%, a dynamic stress of ±2%, and a frequency of 20 Hz. The results are shown as an index using one of the carbon black formulations as 100. The larger the figure, the better the wet braking performance shown.

Rolling Resistance Index

A viscoelasticity spectrometer made by Toyo Seiki Seisakusho Co. was used and the tan δ was measured under conditions of a temperature of 60° C., a static stress of 10%, a dynamic stress of ±2%, and a frequency of 20 Hz. The results are shown as an index using one of the carbon black formulations as 100. The smaller the figure, the smaller the rolling resistance.

Electrical Resistance

The volume specific resistance was measured by ASTM D991 or JIS K6911.

As clear from the results of Table II-5 to Table II-8, compared with the rubber compositions of Comparative Examples II-1 to II-19 where ordinary carbon black or silica was blended rather than blending the surface-treated carbon black, the rubber compositions of Examples II-1 to II-14 where surface-treated carbon black was blended gave rubber with an excellent wet braking performance and low rolling resistance while maintaining an excellent wear resistance. Further, with the examples of the invention, it was possible to reduce the electrical resistance compared with formulations of silica.

Examples II-15 to II-16 and Comparative Examples II-20 to II-22

Various rubber compositions were prepared by the formulations (parts by weight) shown in the above Table II-3 and Table II-9 by an ordinary method by mixing and kneading by a Bambury mixer and kneading roller. These rubber compositions were vulcanized by pressing at 160° C. for 20 minutes to prepare test pieces which were then subjected to various tests. The results are shown in Table II-9. Note that the characteristic value of the reinforcing agent is a value including carbon black and silica.

TABLE II-9

|  | Comp. Ex. II-20 | Comp. Ex. II-21 | Ex. II-15 | Ex. II-16 | Comp. Ex. II-22 |
|---|---|---|---|---|---|
| Carbon black N 339*[1] | 50 | — | — | — | — |
| Silica*[2] | — | 50 | — | — | — |
| Surface-treated carbon 1*[3] | — | — | 50 | — | — |
| Surface-treated carbon 2*[3] | — | — | — | 50 | — |
| Surface-treated carbon 5*[3] | — | — | — | — | 50 |
| Silane coupling agent | — | 4 | 2 | 2 | 2 |
| Vulcanization promoter | — | 2 | — | — | — |
| Wear resistance index | 100 | 75 | 99 | 98 | 97 |
| Wet braking performance | 100 | 107 | 100 | 99 | 101 |
| Rolling resistance index | 100 | 71 | 73 | 72 | 71 |
| Electrical resistance ($\Omega$ cm) | 1.23E + 2 | 1.7E + 14 | 2.0E + 2 | 2.2E + 2 | 2.4E + 2 |
| Vulcanization acceleration index | 100 | 135 | 110 | 112 | 112 |

*[1]Carbon black N 339: Seast KH (made by Tokai Carbon Co.)
*[2]Silica: Nipsil AQ (made by Nippon Silica Industry Co.)
*[3]Surface-treated carbon 1, 2, 5: see Table II-1

As is clear from the results of Table II-9, when the silica surface-treated carbon black of the present invention is blended instead of the usual carbon black (Examples II-15 to II-16), as compared with the case where just carbon black is blended (Comparative Example II-20) and the case where just silica is blended (Comparative Example II-21), the rolling resistance index is vastly improved, without detracting from the other properties.

Note that in the case where silica was used, (Comparative Example II-21), the rolling resistance was improved, but the wear resistance became poor and, further, as expected, the vulcanization rate became slower.

Accordingly, the Examples of the present invention can be said to improve the important properties of the wear resistance, wet braking performance, rolling resistance index, electrical resistance, vulcanization rate, etc. with a good balance.

Example II-17 and Comparative Examples II-23 to II-24

Various rubber compositions were prepared by the formulations (parts by weight) shown in Table II-4 and Table II-10 by an ordinary method by mixing and kneading by a Bambury mixer and kneading roller. These rubber compositions were vulcanized by pressing at 160° C. for 20 minutes to prepare test pieces for cap treads which were then subjected to various tests. The results are shown in Table II-10.

TABLE II-10

|  | Comp. Ex. II-23 | Comp. Ex. II-24 | Ex. II-17 |
|---|---|---|---|
| Carbon black N 220*[1] | 80 | — | — |
| Silica*[2] | — | 80 | — |
| Surface-treated carbon 6*[3] | — | — | 80 |
| Silane coupling agent | — | 8 | 4 |
| Vulcanization promoter | — | 4 | — |

TABLE II-10-continued

|  | Comp. Ex. II-23 | Comp. Ex. II-24 | Ex. II-17 |
|---|---|---|---|
| Wear resistance index | 100 | 79 | 103 |
| Wet braking performance | 100 | 103 | 104 |
| Rolling resistance index | 100 | 71 | 76 |
| Electrical resistance ($\Omega$cm) | 8.1 E − 1 | 2.1 E + 14 | 1.1 E + 0 |
| Vulcanization acceleration index | 100 | 131 | 110 |

*[1])Carbon black N 220: Seast 6 (made by Tokai Carbon Co.)
*[2])Silica: Nipsil AQ (made by Nippon Silica Kogyo Co.)
*[3])Surface-treated carbon 6: see Table II-1

As is clear from the results of Table II-10, by blending in the surface-treated carbon black of the present invention, it is possible to obtain a rubber composition having an improved wear resistance and wet braking performance and having a low electrical resistance and an extremely low rolling resistance.

INDUSTRIAL APPLICABILITY

As is clear from the results of Table I-1 and Table I-2, the rubber composition containing silica surface-treated carbon black according to the present invention can be produced by a method the same as with an ordinary carbon master batch. The resultant composition also gives a rubber having a lower tan $\delta$ at a high temperature region (60° C.) compared with one with regular carbon black and does not fall in wear resistance. According to the present invention, further, by blending the silica surface-treated carbon black, it is possible to give a rubber which is superior to one with regular carbon black and has a wet grip and low rolling resistance equal to or better than one with just silica. Further, compared with a conventional silica filler, the resultant electrical resistance is small, and therefore, there is no problem of generation of noise in the ratio or other electronic devices. Also, the dispersibility in a compound is good. In addition, the wear resistance is superior than with silica alone and the vulcanization rate is not slow, and therefore, addition of a vulcanization accelerator etc. is not required.

We claim:

1. A rubber composition comprising (a) at least one rubber component containing a diene rubber and (b) a rubber reinforcing carbon black having silica deposited on the surface thereof.

2. A rubber composition as claimed in claim 1, wherein said composition is obtained by coagulating with a coagulating agent a mixture of (a) 100 parts by weight, in terms of solid content, of rubber latex containing a diene rubber and (b) 10 to 250 parts by weight, in terms of solid content, of a slurry of a rubber reinforcing carbon black having amorphous silica deposited on the surface thereof.

3. A rubber composition as claimed in claim 2, wherein the rubber reinforcing carbon black prior to the deposition of the amorphous silica is a GPF to SAF grade produced by the oil furnace method.

4. A rubber composition as claimed in claim 2 or 3, further comprising 5 to 150 parts by weight of an aromatic process oil and/or high viscosity oil.

5. A rubber composition as claimed in any one of claims 2 to 4, wherein the content of the amorphous silica is 0.1 to 20% by weight of the surface-treated carbon black.

6. A rubber composition as claimed in claim 1 which is a rubber composition for tire use comprising at least one rubber containing a diene rubber to which is blended surface-treated carbon black composed of rubber reinforcing carbon black having a nitrogen specific surface area ($N_2SA$) of 25 to 250 $m^2/g$ and a DBP oil absorption of 70 to 180 ml/100 g on the surface of which is deposited 0.1 to 20% by weight of silica.

7. A rubber composition as claimed in claim 6, which is for tire cap or under tread use, wherein the carbon black prior to the surface treatment has a nitrogen specific surface area ($N_2SA$) of 55 to 250 $m^2/g$ and a DBP oil absorption of 70 to 180 ml/100 g, and the amount of formulation of the surface-treated carbon black is 10 to 200 parts by weight based upon 100 parts by weight of the rubber.

8. A rubber composition as claimed in claim 7, which is for tire side tread use, wherein the carbon black prior to the surface treatment has a nitrogen specific surface area ($N_2SA$) of 25 to 120 $m^2/g$ and a DBP oil absorption of 70 to 150 ml/100 g, and the amount of formulation of the surface-treated carbon black is 10 to 100 parts by weight based upon 100 parts by weight of the rubber.

9. A rubber composition as claimed in claim 6, which is for covering tire belt cords, wherein the carbon black prior to the surface treatment has a nitrogen specific surface area ($N_2SA$) of 70 to 150 $m^2/g$ and a DBP oil absorption of 70 to 150 ml/100 g, and the amount of formulation of the surface-treated carbon black is 10 to 100 parts by weight based upon 100 parts by weight of the rubber.

* * * * *